United States Patent
He et al.

(10) Patent No.: US 10,225,729 B2
(45) Date of Patent: Mar. 5, 2019

(54) MULTI-CARD USER EQUIPMENT AND SERVICE PROCESSING METHOD AND DEVICE THEREOF

(71) Applicant: SPREADTRUM COMMUNICATIONS (SHANGHAI) CO., LTD., Zhangjiang, Shanghai (CN)

(72) Inventors: Yi He, Shanghai (CN); Xianliang Chen, Shanghai (CN); Xichun Gao, Shanghai (CN); Jinjin Ni, Shanghai (CN); Yiguo Zhao, Shanghai (CN); Yutai Hao, Shanghai (CN); Jin Xu, Shanghai (CN); Chen Tang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/804,524

(22) Filed: Nov. 6, 2017

(65) Prior Publication Data
US 2018/0132098 A1    May 10, 2018

(30) Foreign Application Priority Data
Nov. 8, 2016    (CN) .......................... 2016 1 0982441

(51) Int. Cl.
*H04W 8/18*    (2009.01)
*H04B 1/3816*    (2015.01)
*H04W 88/06*    (2009.01)

(52) U.S. Cl.
CPC .......... *H04W 8/183* (2013.01); *H04B 1/3816* (2013.01); *H04W 88/06* (2013.01)

(58) Field of Classification Search
CPC ..... H04B 1/3816; H04W 88/06; H04W 8/183
See application file for complete search history.

(56) References Cited

U.S. PATENT DOCUMENTS

| 8,204,502 | B2 | 6/2012 | Khetawat et al. |
| 8,483,759 | B2 | 7/2013 | Shi et al. |
| 9,113,450 | B2 | 8/2015 | Pelletier et al. |
| 2002/0154632 | A1* | 10/2002 | Wang ................ H04W 48/18 370/389 |
| 2004/0229601 | A1 | 11/2004 | Zabawskyj et al. |
| 2009/0180451 | A1 | 7/2009 | Alpert et al. |
| 2010/0027467 | A1 | 2/2010 | Wu et al. |

(Continued)

OTHER PUBLICATIONS

USPTO Non-Final Office Action corresponding to U.S. Appl. No. 15/804,494; dated Jul. 9, 2018.

*Primary Examiner* — Devan A Sandiford
(74) *Attorney, Agent, or Firm* — Cantor Colburn LLP

(57) ABSTRACT

A multi-card user equipment, and service processing method and device thereof are provided. The method includes, when receiving a service request, detecting whether a data transmission channel has been established with a network, wherein a number of the established data transmission channels is less than a number of the subscriber identity cards in the multi-card user equipment; and processing a service corresponding to the service request by using the established data transmission channel. With the method, multiple cards can be provided service at the same time, while hardware cost and complexity is decreased and wireless transmission resources is saved.

19 Claims, 4 Drawing Sheets

(56) References Cited

U.S. PATENT DOCUMENTS

| | | | |
|---|---|---|---|
| 2010/0105433 A1* | 4/2010 | Lin | H04B 1/3816 455/558 |
| 2012/0115493 A1* | 5/2012 | Matada | H04W 72/048 455/450 |
| 2012/0135715 A1* | 5/2012 | Kang | H04W 8/183 455/412.1 |
| 2012/0142348 A1* | 6/2012 | Park | H04W 52/0209 455/435.1 |
| 2013/0316766 A1* | 11/2013 | Nousiainen | H04B 1/3816 455/558 |
| 2014/0351832 A1 | 11/2014 | Cho et al. | |
| 2015/0282013 A1* | 10/2015 | Kim | H04L 65/1069 370/331 |
| 2015/0327207 A1* | 11/2015 | Bharadwaj | H04W 8/04 455/435.2 |
| 2016/0014579 A1* | 1/2016 | Kasilya | H04W 4/16 455/417 |
| 2016/0029274 A1* | 1/2016 | Ng | H04B 1/3816 455/437 |
| 2016/0278128 A1 | 9/2016 | Krishnamurthy | |
| 2016/0381710 A1 | 12/2016 | Bansal et al. | |
| 2017/0105193 A1* | 4/2017 | Liu | H04W 68/12 |
| 2018/0063881 A1* | 3/2018 | Shah | H04W 76/028 |
| 2018/0131402 A1* | 5/2018 | He | H04B 1/3816 |
| 2018/0132097 A1* | 5/2018 | Ni | H04W 8/183 |

* cited by examiner

MULTI-CARD USER EQUIPMENT AND SERVICE PROCESSING METHOD AND DEVICE THEREOF

CROSS-REFERENCE TO RELATED APPLICATIONS

This application claims the benefit of priority to Chinese Patent Application No. 201610982441.5, filed Nov. 8, 2016, the entire disclosure of which are incorporated herein by reference.

TECHNICAL FIELD

The invention generally relates to communication technology field, and specifically relates to a multi-card user equipment, and service processing method and device thereof.

BACKGROUND

With many mobile network protocols having been commercialized, it's common that one cell is covered with multiple network signals, where different Mobile Network Operators compete fiercely, and brings more choices for subscribers.

In order to facilitate subscribers choosing mobile network flexibly according to their own needs, most user equipments have multi-card functions.

Currently, most multi-card user equipments can only provide service for one subscriber identity card at one moment. In other words, the existing multi-card user equipments can't provide services for multiple subscriber identity cards at a same time, which does not meet service need of subscribers.

In order to meet the subscribers' service need, a multi-card user equipment which can provide services for multiple subscriber identity cards at a same time emerges. However, hardware cost and complexity of this kind of user equipment is high, and it also occupies too much radio transmission resources.

SUMMARY

Embodiments of the present disclosure provide a method for providing services for multi-cards of an user equipment at the same time, which decreases hardware cost and complexity of a multi-card user equipment, and saves radio transmission resources.

A multi-card user equipment service processing method is provided, including: when receiving a service request, detecting whether a data transmission channel has been established with a network, wherein the established data transmission channel includes a data channel and a wireless connection, wherein a number of the established data transmission channels is less than a number of the subscriber identity cards in the multi-card user equipment; and processing a service corresponding to the service request by using the established data transmission channel, when the data transmission channel has been established with the network.

Optionally, the number of the established data transmission channel may be one.

Optionally, the multi-card user equipment may include: a first subscriber identification card and a second subscriber identification card, wherein the first subscriber identification card is a card which corresponds to the service request, and the second subscriber identification card is a card which establishes the established data transmission channel.

Optionally, processing a service corresponding to the service request by using the established data transmission channel, may include: determining whether the first subscriber identification card and the second subscriber identification card are a same subscriber identification card; and establishing a connection between the first subscriber identification card and the data channel in the established data transmission channel, and using the established data transmission channel to process the service corresponding to the service request, when the first subscriber identification card is different from the second subscriber identification card.

Optionally, the method may further include: storing a mapping relation between the first subscriber identification card and the data channel in the established data transmission channel, when the first subscriber identification card is different from the second subscriber identification card.

Optionally, the mapping relation may include: a corresponding relation between, a port number which is needed by the first subscriber identification card to establish a connection with the data channel in the established data transmission channel, with an IP address of the data channel to which the first subscriber identification card is connected.

Optionally, the method may further include: when receiving data transmitted by the network, distributing the received data to a corresponding subscriber identification, based on the stored mapping relation between the subscriber identification cards and the data channel in the established data transmission channel.

Optionally, the service may include a basic service or a supplementary service, wherein the basic service includes any one of registration service, voice service, video service, short message service and data service.

Optionally, when the service request is a VoLTE service request, and the second subscriber identification card may be a subscriber identification card registered in an LTE network.

Optionally, when the service request is a VoWiFi service request, the second subscriber identification card may be a subscriber identification card registered in a WiFi network.

Optionally, the service request may be initiated by the first subscriber identification card or by the network.

A service processing device of a multi-card user equipment is provided, including: a detection circuitry, configured to detect whether a data transmission channel has been established with a network when a service request is received, wherein the established data transmission channel includes a data channel and a wireless connection, wherein a number of the established data transmission channels is less than a number of the subscriber identification cards in the multi-card user equipment; and a first service processing circuitry, configured to process a service corresponding to the service request using the established data transmission channel, when the data transmission channel has been established with the network.

Optionally, the number of the established data transmission channel may be one.

Optionally, the multi-card user equipment may include: a first subscriber identification card and a second subscriber identification card, wherein the first subscriber identification card is a card corresponding to the service request, and the second subscriber identification card is a card which establishes the established data transmission channel.

Optionally, the first processing circuitry may include: a determining sub-circuitry, configured to determine whether the first subscriber identification card and the second subscriber identification card are a same subscriber identification card; a connection establishing sub-circuitry, configured to establish a connection between the first subscriber identification card and the data channel in the established data transmission channel, when the first subscriber identification card is different from the second subscriber identification card; and a service processing sub-circuitry, configured to use the established data transmission channel to process the service corresponding to the service request.

Optionally, the device further may include: a storage circuitry, configured to store a mapping relation between the first subscriber identification card and the data channel in the established data transmission channel, when the first subscriber identification card is different from the second subscriber identification card.

Optionally, the mapping relation stored by the storage circuitry may include: a corresponding relation between, a port number which is needed by the first subscriber identification card to establish a connection with the data channel in the established data transmission channel, with an IP address of the data channel to which the first subscriber identification card is connected.

Optionally, the device may further include: a second service processing circuitry, configured to: when data transmitted by the network is received, distribute the received data to a corresponding subscriber identification, based on the stored mapping relation between the subscriber identification cards and the data channel in the established data transmission channel.

Optionally, the service may include a basic service or a supplementary service, wherein the basic service includes any one of registration service, voice service, video service, short message service and data service.

Optionally, when the service request is a VoLTE service request, the second subscriber identification card may be a subscriber identification card registered in an LTE network.

Optionally, when the service request is a VoWiFi service request and the second subscriber identification card may be a subscriber identification card registered in a WiFi network.

Optionally, the service request may be initiated by the first subscriber identification card or by the network.

A multi-card user equipment is provided, including: a first subscriber identification card and a second subscriber identification card, a data transmission channel establishing device, and a service processing device of a multi-card user equipment, wherein: the first subscriber identification card is a subscriber identification card which corresponds to the service request; the second subscriber identification card is a subscriber identification card establishes the established data channel and the wireless connection; the data transmission channel establishing device is configured to establish a data transmission channel between the multi-card user equipment and the network; and wherein the established data transmission channel includes a data channel and a wireless connection; the service processing device of the multi-card user equipment includes: a detection circuitry, configured to detect whether a data transmission channel has been established with a network when a service request is received, wherein the established data transmission channel includes a data channel and a wireless connection, wherein a number of the established data transmission channels is less than a number of the subscriber identification cards in the multi-card user equipment; and a first service processing circuitry, configured to process a service corresponding to the service request using the established data transmission channel, when the data transmission channel has been established with the network.

Compared with existing techniques, embodiments of the present disclosure may provide following advantages.

In the method, a multi-card mobile detects whether a data channel and a wireless connection have been established between the multi-card user equipment and a network when a service request is received, and then processes a service corresponding to the service request using the established data channel and the wireless connection, when the data channel and the wireless connection have been established. Since the number of the established data transmission channels is less than the number of the subscriber identification cards in the multi-card user equipment, the number of circuits for establishing the data transmission channel in the multi-card user equipment may be less than the number of the subscriber identity cards, which may effectively reduce hardware costs and complexity of the multi-card user equipment and save network transmission resources.

DETAILED DESCRIPTION

At present, when one of multiple subscriber identification cards generates a service request, a multi card user equipment establishes a data transmission channel with a network for the one of multiple subscriber identification cards correspondingly. While multiple subscriber identification cards generate service requests at the same time, the multi-subscriber identification card user equipment establishes a data transmission channel corresponding to each subscriber identification card separately. In other words, in the existing multi-subscriber identification card user equipment that may provide services for multiple subscriber identification cards simultaneously, there is one-to-one correspondence between the established data transmission channels and the multiple subscriber identity cards.

Figure 1:
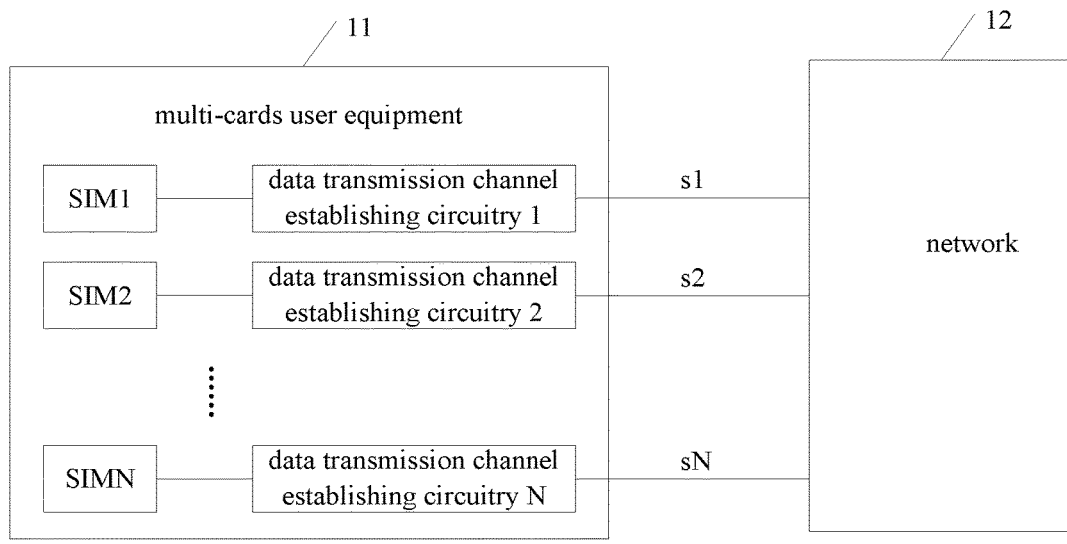
FIG. 1 schematically illustrates a structural diagram of a multi-card user equipment according to the existing techniques.

For example, referring to FIG. 1, multi-cards user equipment 11 includes N pieces of subscriber identification cards: SIM1, SIM2, . . . , and SIMN. Each subscriber identification card which corresponds to a data transmission channel establishing circuitry. For example, a data transmission channel establishing circuitry 1 is configured to establish a data transmission channel s1 between a network 12 and SIM1 when SIM1 generates a service request, a data transmission channel establishing circuitry 2 is configured to establish a data transmission channel s2 between the network 12 and SIM2 when SIM2 generates a service request, . . . , and a data transmission channel establishing circuitry N is configured to establish a data transmission channel sN between the network 12 and SIMN when SIMN generates a service request.

As seen from FIG. 1, when the multi-card user equipment 11 includes N subscriber identification cards, the multi-card user equipment 11 needs to set up N data transmission channel establishing circuitries, thereby may result in high hardware cost and complexity of the multi-card user equipment 11.

A service processing method of a multiple card user equipment is provided according to an embodiment of the present disclosure. In the method, a multi-card mobile detects whether a data channel and a wireless connection have been established between the multi-card user equipment and a network when a service request is received, and then processes a service corresponding to the service request using the established data channel and the wireless connection, when the data channel and the wireless connection have been established. Since the number of the established data transmission channels is less than the number of the subscriber identification cards in the multi-card user equipment, the number of circuits for establishing the data transmission channel in the multi-card user equipment may be less than the number of the subscriber identity cards, which may effectively reduce hardware costs and complexity of the multi-card user equipment and save network transmission resources.

In order to clarify the object, solutions and advantages of embodiments of the present disclosure, embodiments of present disclosure will be described clearly in detail in conjunction with accompanying drawings.

Figure 2:
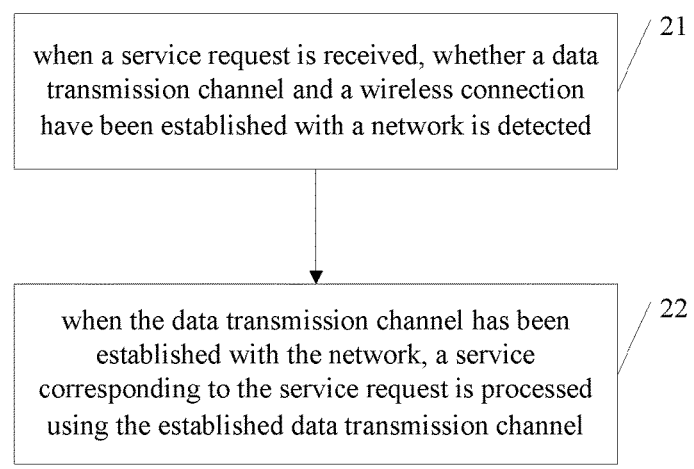
FIG. 2 schematically illustrates a flow chart of a service processing method of a multi-card user equipment according to an embodiment of the disclosure.

Referring to FIG. 2, a flow chart of a service processing method of a multi-card user equipment according to an embodiment of the disclosure, the method may include 21 and 22.

In 21, when a service request is received, whether a data transmission channel and a wireless connection have been established with a network is detected.

The established data transmission channel includes a data channel and a wireless connection, wherein a number of the established data transmission channels is less than a number of the subscriber identity cards in the multi-card user equipment.

In some embodiments, a service corresponding to the service request may be various. For example, the service may be a basic service, such as any one of registration service, voice service, video service, short message service and data service. The service may be a supplementary service which is relevant to supplementing or modifying the basic service, for example, calling transfer service. The service request may be initiated by any subscriber identification card in the multi-card user equipment, or by the network.

In some embodiments, the network may include a wireless network for establishing a wireless connection and a service network providing a service for the multi-card user equipment.

In some embodiments, the wireless network may be 5G, 4G, 3G, or General Packet Radio Service (GPRS), which may be realized through public mobile communication network. The wireless network may also be a wireless local area network (WiFi) or the like. Other networks are possible, as long as a wireless electromagnetic wave is implemented as a transmission medium. Services based on 4G Long Term Evolution (LTE) network include voice service, video service, short message and the like, wherein the voice service is a VoLTE service. Services based on WiFi network include voice service, video service, short message and the like, wherein the voice service is a VoWiFi service.

In some embodiments, a service network corresponds to a service request. For example, if the service request is a VoLTE service request or a VoWiFi service request, the service network may be an IP Multimedia Subsystem (IMS) network.

In some embodiments, the number of the established data transmission channels is less than the number of the subscriber identification cards in the multi-card user equipment. For example, when four subscriber identification cards are provided in the multi-card user equipment, the established data transmission channel may be one, and also may be two, and three, or other numbers. The less the number of the data transmission channel is, the lower the hardware cost and the complexity of the multi-card user equipment are, and the fewer network resources are occupied. In an embodiment of the present disclosure, the number of the established data transmission channels is one.

In some embodiments, each wireless connection may correspond to only one data channel, or may correspond to a plurality of data channels, and is not limited specifically. The established data transmission channel may include only one wireless connection, but include a plurality of data channels, or may include only one wireless connection and one data channel, or may include a plurality of wireless connections and a plurality of data channels at the same time, wherein the data channel corresponding to a same subscriber identification card and the wireless connection corresponding to the data channel constitute a data transmission channel. Through the data transmission channel, the multi-card user equipment may make signaling interaction with the network, so as to process the service corresponding to the service request.

In 22, when the data transmission channel has been established with the network, a service corresponding to the service request is processed using the established data transmission channel.

In some embodiments, the multi-card user equipment may generally include a first subscriber identification card and a second subscriber identification card. The first subscriber identification card is a card corresponding to the service request, and the second subscriber identification card is a card which establishes the established data transmission channel.

It should be noted that, the first subscriber identification card may be any subscriber identification card in the multi-card user equipment. In other words, any subscriber identification card in the multi-card user equipment may be the subscriber identification card corresponding to the service request.

In some embodiments, the multi-card user equipment may include only one second subscriber identification card, and the number of the data transmission channel established by the multi-card user equipment may be one or more. The multi-card user equipment may also include a plurality of second subscriber identification cards, each of which may uniquely correspond to one of the established data transmission channels. The second subscriber identification card may be same with the first subscriber identification card, or may be different from the first subscriber identification card.

In some embodiments, when the service corresponding to the service request is processed using the established data transmission channel, it may be determined that whether the first subscriber identification card and the second subscriber identification card are a same subscriber identification card first. When the first subscriber identification card and the second subscriber identification card are the same subscriber identification card, the established data transmission channel may be used directly to process the service corresponding to the service request.

When the first subscriber identification card is different from the second subscriber identification card, if the established data transmission channel is only one, a connection between the first subscriber identification card and the data channel of the established data transmission channel may be established. And the service corresponding to the service request is processed using the established data transmission channel. If there is a plurality of established data transmission channels, a connection between the first subscriber identification card with a data channel in any one of the established data transmission channels may be established, and the service corresponding to the service request is processed using any one of the data transmission channels where the established data channel with the connection is located.

Figure 3:
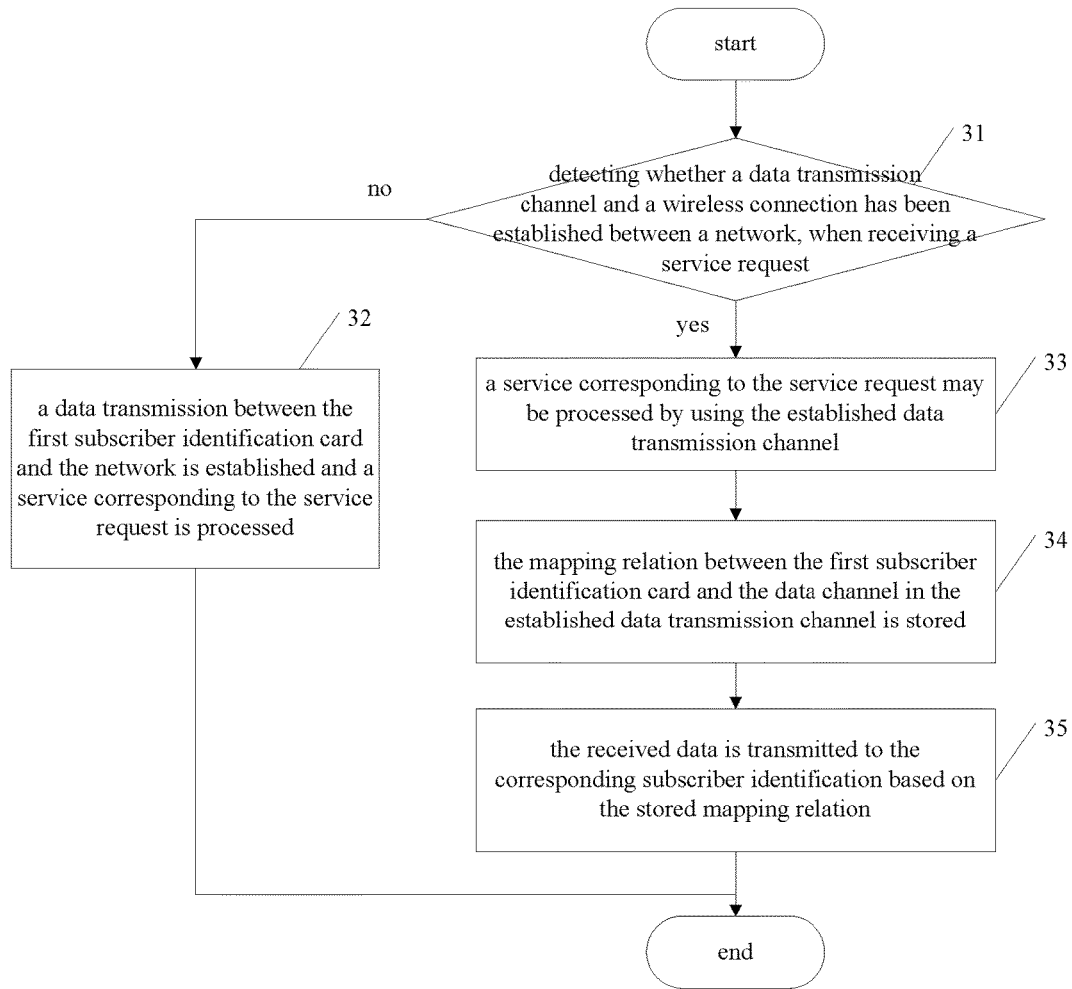
FIG. 3 schematically illustrates another flow chart of a service processing method according to an embodiment of the disclosure.

FIG. 3 schematically illustrates another flow chart of a method for processing services of a multi-card user equipment according to the embodiment of the disclosure, the method may include steps 31 to 35:

In 31, detecting whether a data transmission channel and a wireless connection has been established between a network, when receiving a service request.

When no data transmission channel is established between the terminal and the network, 32 is executed, otherwise 33 is executed.

In 32, a data transmission between the first subscriber identification card and the network is established and a service corresponding to the service request is processed using the established data transmission channel.

In some embodiments, as the service request is different, a corresponding wireless network and service network are different, and the established data transmission channel may also be different.

Take the subscriber identification card supporting the VoLTE as an example, when the VoLTE service request is received, and the data transmission channel between the first subscriber identification card and an IMS network is established based on an LTE network, a wireless connection between the first subscriber identification card and the LTE network may be established according to the service request first.

Afterward, the multi-card user equipment interacts with the IMS network based on the wireless connection, establishes PDN1 for transmitting data with the IMS network, that is, establishes a data channel with the IMS network. In embodiments of the present disclosure, the established data channel is referred to as IMS PDN1.

Through the wireless connection and the data channel IMS PDN1, the first subscriber identification card is registered with the IMS network to establish a connection between the first subscriber identification card and the data channel IMS PDN1, that is, establishing a mapping relation between the first subscriber identify card and the data channel IMS PDN1. In some embodiments, the mapping relation is typically a corresponding relationship between a port number which is needed by the first subscriber identification card to establish a connection with the data channel IMS PDN1, and an IP address of the data channel IMS PDN1. Wherein the port number may include a port number corresponding to the first subscriber identification card as a transmitting end and a port number corresponding to the first subscriber identification card as a receiving end.

After registration on the IMS network, the data transmission channel between the first subscriber identification card and the IMS network is established, and the VoLTE service of the first subscriber identification card may be processed based on the established data transmission channel. The data from the first subscriber identification card are transmitted to the base station through the wireless connection with the LTE network, and the base station transmits the data to the IMS network via the data channel IMS PDN1.

The multi-card user equipment and the LTE network typically store a mapping relation between the first subscriber identification card and the data channel IMS PDN1, so that data may be sent to the first subscriber identification card when the data transmitted to the first subscriber identification card are received from the IMS network.

When no data transmission channel is established with the network, a data transmission channel may be establish between any one of other subscriber identification cards and the network, that is, a specific subscriber identification card may be regarded as a subscriber identification card for establishing a data transmission channel. It is understandable that the data transmission channel may be established regardless of which subscriber identification card is used. In embodiments of the present disclosure, a subscriber identification card which establishes the data transmission channel is referred to as a second subscriber identification card.

It should be noted that, in the embodiments of the present disclosure, the radio resource occupied by the multi-card user equipment may be different for different services. For example, when the service request is a voice service request, the occupied radio resource may be a voice dedicated bearer. When the service request is a video service request, the occupied radio resource includes both a voice dedicated bearer and a video dedicated bearer which may be performed by reassembling a same RRC connection.

In 33, a service corresponding to the service request may be processed by using the established data transmission channel.

In some embodiments, establishing a connection between the first subscriber identification card with a data channel in the established data transmission channel is establishing a mapping relation between the first subscriber identification card and the data channel in the established data transmission channel. Specifically, how to establish a connection between the first subscriber identification card and the data channel IMS PDN1 in the above description of 32 may be referred, and detailed descriptions are not attached herein.

Take a dual-card dual-standby user equipment M as an example, the dual card dual standby user equipment includes two subscriber identification cards, SIM1 and SIM2 respectively, wherein SIM1 is a first subscriber identification card, SIM2 is a second subscriber identification card, and both SIM1 and SIM2 support VoLTE. SIM2 is registered with the LTE network before SIM1 initiates a VoLTE service request. SIM1 may be registered with the LTE network or registered on a 2G or 3G network. The dual-card dual-standby user equipment establishes a data transmission channel s1 based on SIM2, and the IP address of the data channel IMS PDN2 in the data transmission channel s1 is IP1.

When SIM1 initiates a service request, the data transmission channel may be processing the service corresponding to SIM2 or may be in an idle state, no specific limitation is herein. After SIM1 initiates the service request, the dual-card dual-standby user equipment establishes the connection between SIM1 and the data channel IMS PDN2 based on the service request, that is, establishes the mapping relation between SIM1 and the data channel IMS PDN2. The mapping relation includes a corresponding relationship between a port number which is needed by SIM1 to establish a connection with the data channel s1, and an IP address IP1 of the data channel IMS PDN2. After the connection between SIM1 and the data channel IMS PDN2 is established, the VoLTE service of SIM1 may be processed using the data transmission channel s1.

When both SIM1 and SIM2 support VoWiFi, SIM2 is registered with the WIFI network before SIM1 initiates a VoWiFi service request. SIM1 may be registered with a WIFI network or registered with a 2G, 3G, 4G or 5G network. Thereafter, a process of establishing a data transmission channel s1 for the VoLTE service request of SIM1 may be referred to establish a corresponding data transmission channel for the VoWiFi service request of SIM1, and detailed descriptions are not attached herein.

In 34, the mapping relation between the first subscriber identification card and the data channel in the established data transmission channel is stored, when the first subscriber identification card is different from the second subscriber identification card.

For example, in the dual-card dual-standby user equipment M mentioned above, the data transmission channel between SIM1 and the IMS network is established after SIM1 is registered on the data channel IMS PDN2. In this case, the dual card dual standby user equipment M and the LTE network may store a corresponding relation between the SIM1 and the IP address IP1 of the data channel IMS PDN2, which the received data may be send to SIM1 after receiving the data transmitted from the IMS network to the SIM1.

In 35, the received data is distributed to the corresponding subscriber identification based on the stored mapping relation between the subscriber identification card and the data channel in the established data transmission channel card, after the data transmitted by the network is received.

In some embodiments, the data transmitted by the IMS network is transmitted to a base station of the wireless network via the corresponding data channel, and then the data is transmitted by the base station to the multi-card user equipment via the wireless connection. Since the multi-card user equipment stores the mapping relation between the subscriber identification card and the data channel in the established data transmission channel, after the data transmitted by the wireless network is received, the data is transmitted to a corresponding subscriber identification card according to the stored mapping relationship between the subscriber identification card and the data channel in the established data transmission channel.

In the embodiments of the present disclosure, when a service request corresponding to the first subscriber identification card is received, the multi-card user equipment may be in an idle state, i.e., no service is currently being processed, or may be in a service processing state, i.e., currently processing service of other subscriber identification cards. That is, the multi-card user equipment in the embodiments of the present disclosure may simultaneously process the service corresponding to the plurality of subscriber identification cards. Whether the multi-card user equipment is currently processing service or not is not limited to the present disclosure.

From above, in this method, Since the number of the established data transmission channels is less than the number of the subscriber identification cards in the multi-card user equipment, the number of circuits for establishing the data transmission channel in the multi-card user equipment may be less than the number of the subscriber identity cards, which may effectively reduce hardware costs and complexity of the multi-card user equipment and save network transmission resources.

In order to make those skilled in the art to better understand and implement the present disclosure, detailed description of a structure of a device for processing a multi-card user equipment service is provided below.

Figure 4:
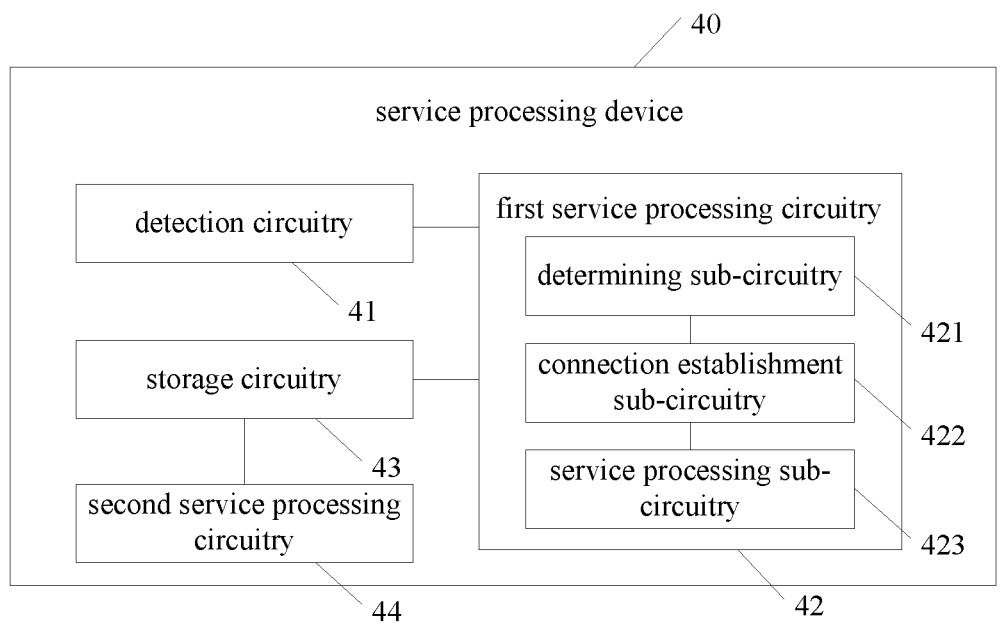
FIG. 4 schematically illustrates a structural diagram of service processing device of a multi-card user equipment according to an embodiment of the disclosure.

Referring to FIG. 4, FIG. 4 schematically illustrates a structural diagram of a service processing device 40 of a multi-card user equipment according to the embodiment of the disclosure. The device 40 may include a detection circuitry 41 and a first service processing circuitry 42.

The detection circuitry 41 may be configured to detect whether a data transmission channel and a wireless connection has been established between a network when receiving a service request, wherein the established data transmission channel includes a data channel and a wireless connection, wherein a number of the established data transmission channels is less than a number of the subscriber identification cards in the multi-card user equipment.

The first service processing circuitry 42 may be configured to process a service corresponding to the service request, implementing the established data transmission channel when the data transmission channel has been established with the network.

In some embodiments, wherein the number of the established data transmission channel is one.

In some embodiments, wherein the multi-card user equipment includes: a first subscriber identification card and a second subscriber identification card, wherein the first subscriber identification card is a card corresponding to the service request, wherein the second subscriber identification card is a card which establishes the established data transmission channel.

In some embodiments, wherein the first processing circuitry 42 may include a determining sub-circuitry 421, a connection establishment sub-circuitry 422, and a service processing sub-circuitry 423.

The determining sub-circuitry 421 may be configured to determine whether the first subscriber identification card and the second subscriber identification card are a same subscriber identification card;

The connection establishment sub-circuitry 422 may be configured to establish a connection between the first subscriber identification card and the data channel in the established data transmission channel, when the first subscriber identification card is different from the second subscriber identification card;

The service processing sub-circuitry 423 may be configured to implement the established data transmission channel to process the service corresponding to the service request.

In some embodiments, the device 40 may also include a storage circuitry 43. The storage circuitry 43 may be configured to store a mapping relationship between the first subscriber identification card and the data channel in the established data transmission channel, when the first subscriber identification card is different from the second subscriber identification card.

In some embodiments, the mapping relationships stored by the storage circuitry 43 include: a corresponding relationship between a port number which is needed by the first subscriber identification card to establish a connection with the data channel in the established data transmission channel, and a IP address of a data channel to which the first subscriber identification card connects.

In some embodiments, the device 40 may also include a second service processing circuitry 44, the second service processing circuitry 44, may be configured to distribute the received data to a corresponding subscriber identification, based on the mapping relationship between a stored subscriber identification card and the data channel in the established data transmission channel card, when receiving the data transmitted by the network.

In some embodiments, the service includes a basic service or a supplementary service; wherein the basic service includes any one of registration service, voice service, video service, short message service and data service.

In some embodiments, when the service request is a VoLTE service request, the second subscriber identification card is a subscriber identification card registered in a LTE network.

In some embodiments, when the service request is a VoWiFi service request, the second subscriber identification card is a subscriber identification card registered in a WiFi network.

In some embodiments, the service request is initiated by the first subscriber identification card in the multi cards terminal, or by the network.

Figure 5:
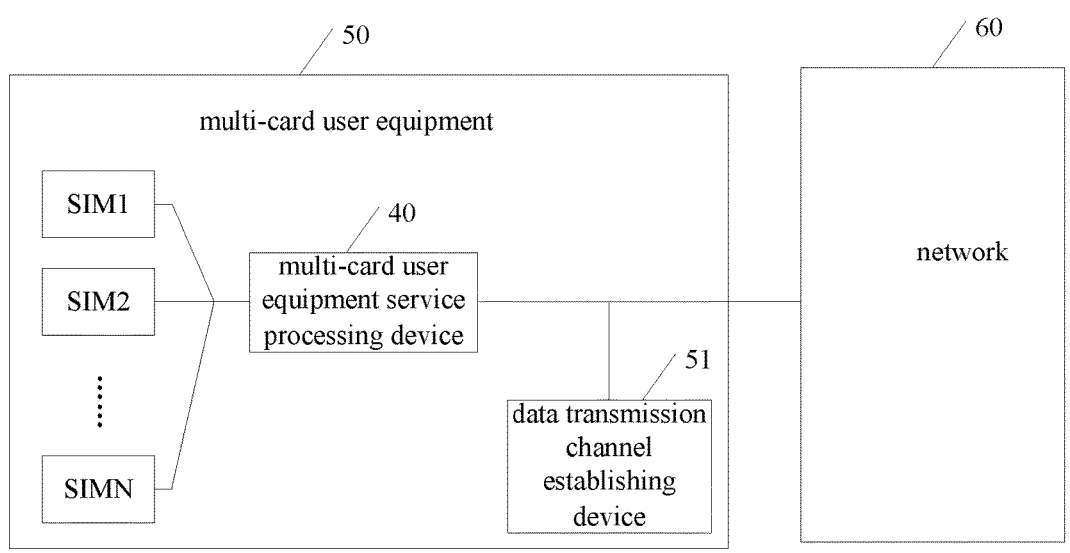
FIG. 5 schematically illustrates a structural diagram of a multi-card user equipment according to an embodiment of the disclosure.

Referring to FIG. 5, a multi-card user equipment 50 according to an embodiment of the present disclosure is provided. The multi-card user equipment 50 may include: a first subscriber identification card and a second subscriber identification card, a data transmission channel establishment device 51, and the multi-card user equipment service processing device 40 described above.

The first subscriber identification card is a subscriber identification card which corresponds to the service request.

The second subscriber identification card is a subscriber identification card establishes the established data channel and the wireless connection;

The data transmission channel establishing device 51 may be configured to establish a data transmission channel between a network 60 for a multi-card user equipment 50, wherein data transmission channel includes a data channel and a wireless connection;

The service processing device 40 may be configured to detect whether a data transmission channel and a wireless connection has been established between a network, when receiving a service request, and process a service corresponding to the service request, implementing the established data transmission channel, when the data transmission channel has been established with the network, wherein a number of the established data transmission channels is less than a number of the subscriber identification cards in the multi-card user equipment.

The first subscriber identification card and the second subscriber identification card may be any one of the SIM1~SIMN.

In some embodiments, the data transmission channel establishment device 51 may include a data channel establishment circuitry and a wireless connection establishment circuitry. When the data transmission channel is established, the wireless connection establishment circuitry establishes a wireless connection between the multi-card user equipment 50 and the wireless network. And then establishing a data channel between the multi-card user equipment 50 and the service network based on the wireless connection by the data channel establishing circuitry. The data transmission channel between the multi-card user equipment 50 and the network 60 is established after both the wireless connection and the data channel are established.

In some embodiments, the multi-card user equipment refers to a computer device that may be implemented in a mobile, including but not limited to devices such as mobile phones, notebooks, tablet PCs, and on-board computers. And the number of the subscriber identification cards is not limited, and the multi-card user equipment may support both a physical subscriber identification card and a non-physical subscriber identification card. For example, the multi-card user equipment may include a virtual subscriber identification card and a physical subscriber identification card, or may include a virtual subscriber identification card and two or more physical subscriber identification cards, and may include more than two virtual subscriber identification cards and more than two physical subscriber identification cards. The multi-card user equipment service processing method according to the embodiment of the present disclosure may be processed based on the service of any subscriber identification card of the multi-card user equipment.

It is to be noted that, in the embodiments of the present disclosure, the subscriber identification card may include a subscriber identification card of various specifications and standards, and is not limited thereto, as long as the implement may be identified based on the information of the subscriber identification card. It is not within the scope of the present disclosure to limit the scope of the disclosure to the subscriber identification cards of the specifications and standards of the subscriber identification cards described above. For example, in a supported network mode, the subscriber identification card may be a normal SIM card, a USIM card, or an eSIM card. In the size of the card, the subscriber identification card may be a standard SIM card of size 25 mm×15 mm or a small SIM card of size 12 mm×15 mm.

Those skilled in the art may understand that all of or a portion of the processes in this method provided in the above embodiments may be implemented by related hardware with instruction of computer program. The computer program may be saved in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A multi-card user equipment service processing method, comprising:
   when receiving a service request, detecting whether a data transmission channel has been established with a network, wherein the established data transmission channel comprises a data channel and a wireless connection, wherein a number of the established data transmission channels is less than a number of the subscriber identity cards in the multi-card user equipment, wherein the multi-card user equipment comprises a first subscriber identification card and a second subscriber identification card, the first subscriber identification card is a card which corresponds to the service request, and the second subscriber identification card is a card which establishes the established data transmission channel;
   if the data transmission channel has been established with the network, determining whether the first subscriber identification card and the second subscriber identification card are a same subscriber identification card; and if the first subscriber identification card is different from the second subscriber identification card, establishing a connection between the first subscriber identification card and the data channel in the established data transmission channel, and using the established data transmission channel to process the service corresponding to the service request.

2. The method according to claim 1, wherein the number of the established data transmission channel is one.

3. The method according to claim 1, further comprising: storing a mapping relation between the first subscriber identification card and the data channel in the established data transmission channel, when the first subscriber identification card is different from the second subscriber identification card.

4. The method according to claim 3, wherein the mapping relation comprises:
a corresponding relation between, a port number which is needed by the first subscriber identification card to establish a connection with the data channel in the established data transmission channel, with an IP address of the data channel to which the first subscriber identification card is connected.

5. The method according to claim 3, further comprising:
when receiving data transmitted by the network, distributing the received data to a corresponding subscriber identification, based on the stored mapping relation between the subscriber identification cards and the data channel in the established data transmission channel.

6. The method according to claim 1, wherein the service comprises a basic service or a supplementary service, wherein the basic service comprises any one of registration service, voice service, video service, short message service and data service.

7. The method according to claim 6, wherein when the service request is a VoLTE service request, and the second subscriber identification card is a subscriber identification card registered in an LTE network.

8. The method according to claim 6, wherein when the service request is a VoWiFi service request, the second subscriber identification card is a subscriber identification card registered in a WiFi network.

9. The method according to claim 1, wherein the service request is initiated by the first subscriber identification card or by the network.

10. A service processing device of a multi-card user equipment, comprising:
a detection circuitry, configured to detect whether a data transmission channel has been established with a network when a service request is received, wherein the established data transmission channel comprises a data channel and a wireless connection, wherein a number of the established data transmission channels is less than a number of the subscriber identification cards in the multi-card user equipment, wherein the multi-card user equipment comprises a first subscriber identification card and a second subscriber identification card, the first subscriber identification card is a card which corresponds to the service request, and the second subscriber identification card is a card which establishes the established data transmission channel;

a determining sub-circuitry, configured to determine whether the first subscriber identification card and the second subscriber identification card are a same subscriber identification card, if the data transmission channel has been established with the network;

a connection establishing sub-circuitry, configured to establish a connection between the first subscriber identification card and the data channel in the established data transmission channel, if the first subscriber identification card is different from the second subscriber identification card; and a first service processing sub-circuitry, configured to use the established data transmission channel to process the service corresponding to the service request.

11. The device according to claim 10, wherein the number of the established data transmission channel is one.

12. The device according to claim 10, further comprising:
a storage circuitry, configured to store a mapping relation between the first subscriber identification card and the data channel in the established data transmission channel, when the first subscriber identification card is different from the second subscriber identification card.

13. The device according to claim 12, wherein the mapping relation stored by the storage circuitry comprises:
a corresponding relation between, a port number which is needed by the first subscriber identification card to establish a connection with the data channel in the established data transmission channel, with an IP address of the data channel to which the first subscriber identification card is connected.

14. The device according to claim 12, further comprising:
a second service processing circuitry, configured to: when data transmitted by the network is received, distribute the received data to a corresponding subscriber identification, based on the stored mapping relation between the subscriber identification cards and the data channel in the established data transmission channel.

15. The device according to claim 10, wherein the service comprises a basic service or a supplementary service, wherein the basic service comprises any one of registration service, voice service, video service, short message service and data service.

16. The device according to claim 15, wherein when the service request is a VoLTE service request, the second subscriber identification card is a subscriber identification card registered in an LTE network.

17. The device according to claim 15, wherein when the service request is a VoWiFi service request and the second subscriber identification card is a subscriber identification card registered in a WiFi network.

18. The device according to claim 10, wherein the service request is initiated by the first subscriber identification card or by the network.

19. A multi-card user equipment, comprising: a first subscriber identification card and a second subscriber identification card, a data transmission channel establishing device, and the service processing device of the multi-card user equipment according to claim 10.

* * * * *